Figure 1:
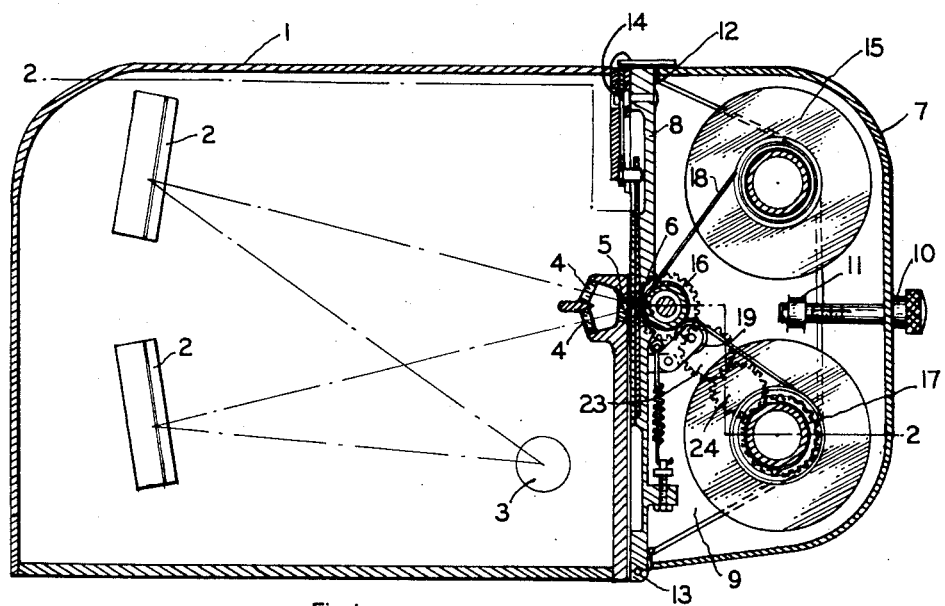

March 22, 1960 F. BARANOWSKI, JR., ET AL 2,929,571
OSCILLOGRAPH FILM HOLDER
Filed May 28, 1954 2 Sheets-Sheet 1

Inventors:
Frank Baranowski jr.
Joseph L. Paine
by Richard E. Hosley
Their Attorney March 22, 1960   F. BARANOWSKI, JR., ET AL   2,929,571
OSCILLOGRAPH FILM HOLDER Filed May 28, 1954                                   2 Sheets-Sheet 2

Inventors:
Frank Baranowski jr.
Joseph L. Paine
by Richard E. Horley
Their Attorney

United States Patent Office 2,929,571
Patented Mar. 22, 1960

2,929,571

OSCILLOGRAPH FILM HOLDER

Frank Baranowski, Jr., Stoneham, and Joseph L. Paine, Marblehead, Mass., assignors to General Electric Company, a corporation of New York Application May 28, 1954, Serial No. 433,044

6 Claims. (Cl. 242—55.11)

This invention relates to oscillographs and in particular to that portion of an oscillograph commonly referred to as the film holder.

In the design of oscillograph film holders, it is a common practice to provide a series of film spools generally consisting of a rotatably mounted supply spool on which the unexposed film is supported, a receiving spool for receiving the film after it has been exposed, and a main drive spool, sometimes referred to as a reference spool, which is positioned to engage the film at a point intermediate the supply spool and the receiving spool. The traces are formed on the film as it passes over the main drive spool where it is exposed through an elongated slot to the light reflected from the galvanometer mirrors. A suitable drive means, usually an electric motor, is provided to drive the main drive spool which in turn drives the film, normally through frictional engagement therewith. The film may be held into frictional engagement with the main drive spool by means of a suitable tensioning device such as a spring loaded roller positioned to bear against the main drive spool.

Drive power is also normally applied to the receiving spool, usually by means of suitable gearing extending between the main drive spool and the receiving spool, in order to wind the film onto the receiving spool as it passes from the main drive spool.

It will be obvious that as the film builds up on the receiving spool, the speed of the receiving spool must be proportionately reduced in order to prevent breakage of the film. This has been normally accomplished in the past by providing a spring loaded friction slip clutch or overrunning drive connection to allow the drive to slip relative to the receiving spool at a predetermined torque level. Thus, as the film tension increases with the film build-up on the receiving spool, the drive will be allowed to slip relative to the receiving spool before a dangerous film tension level is reached.

Spring loaded friction clutches of the type heretofore employed are subject to a number of disadvantages, the most significant of which is that such devices tend to be relatively complicated and expensive to manufacture.

In general, both the receiving spool and the supply spool must be removable from the film holder assembly to allow for insertion of unexposed film and for processing of the film after it has been exposed. It has therefore been a common practice to provide a spring loaded flange at one end of each of these spools which can be manually pushed aside to allow removal of the spools from the film holder assembly. It can be seen that such an arrangement has the disadvantage of placing an axial load on the spool bearings which tends to reduce bearing life, and which by reason of the accompanying increased frictional load, results in an additional load on the drive motor. Other methods for removably mounting the film spools have been devised and used but, in general, they have been subject to various disadvantages such as that removal and insertion of the spools is overly difficult or tedious, or that manufacturing tolerances must be held unusually close in order to keep the end play of the spools within reasonable limits.

Accordingly it is one object of this invention to provide an improved film holder for an oscillograph, in which a slip coupling is provided between the receiving spool and the film holder drive means which is not subject to the above-mentioned disadvantages heretofore encountered and which is simple and inexpensive to manufacture.

It is another object of this invention to provide an improved arrangement for mounting a film spool in an oscillograph film holder so that the spool can be readily and easily inserted and removed.

It is a further object of this invention to provide a simple and inexpensive arrangement for removably mounting a film spool in an oscillograph film holder which arrangement does not result in the application of an axial load on the spool and further in which end play in the spool mounting is virtually eliminated.

It is still a further object of this invention to provide an improved arrangement for removably mounting the receiving spool of an oscillograph film holder which arrangement at the same time provides a slip drive connection between the spool and the film holder drive means.

Briefly stated, in accordance with one aspect of this invention, an oscillograph film holder is provided with the usual film handling spools including a supply spool, a main drive spool and a receiving spool as set forth above. The receiving spool is mounted on a pair of rotatable spindles with one of these spindles being axially movable to allow removal and insertion of the receiving spool. The spindles for supporting the receiving spool are mounted on opposite walls of the film holder and each of these spindles is provided with a suitable extension for engaging and supporting opposite ends of the receiving spool. Cooperating frictional surfaces are provided on the drive spindle and the receiving spool and a permanent magnet is mounted in the receiving spool to urge the receiving spool into frictionally driven engagement with the drive spindle. A slip drive is thus provided which will slip at a predetermined torque level which is determined by the coefficient of friction between the drive surfaces and the magnetic force exerted. It will be apparent that the magnetic force is purely internal and that the frictional surfaces are thus held into engagement to form the slip drive connection without any axial load being placed on the support bearings.

The spindle opposite the drive spindle is axially slidable and is held into engagement with the opposite end of the receiving spool by a similar permanent magnet positioned in that end of the receiving spool. Thus the receiving spool can be readily removed by forcing the axially slidable spindle out of engagement with the spool against the force developed by the magnet. Similarly, when the spool is re-inserted, the magnetic force will draw the axially movable spindle back into engagement with the end of the spool.

A similar axially slidable spindle is provided to support one end of the supply spool and is held into engagement therewith by means of a permanent magnet positioned in the spool. Thus both the supply spool and the receiving spool can be easily and simply inserted and removed by simply pushing the respective flanged spindles aside.

It can be seen that the above arrangement avoids any axial load being placed on the spool bearings while providing for a slip drive connection and for easy and simple removability of both the supply and receiving spools. At the same time, end play in the spool assembly is virtually eliminated, except for that which may be unavoidably present in the bearings themselves. Further, the arrangement is uncomplicated, inexpensive to manufacture, and is composed of relatively rugged components not easily damaged by shocks and other severe operating conditions.

This invention will be better understood and other objects and advantages will be apparent from the following description taken in connection with the accompanying drawings, and its scope will be pointed out in the appended claims.

Figure 2:
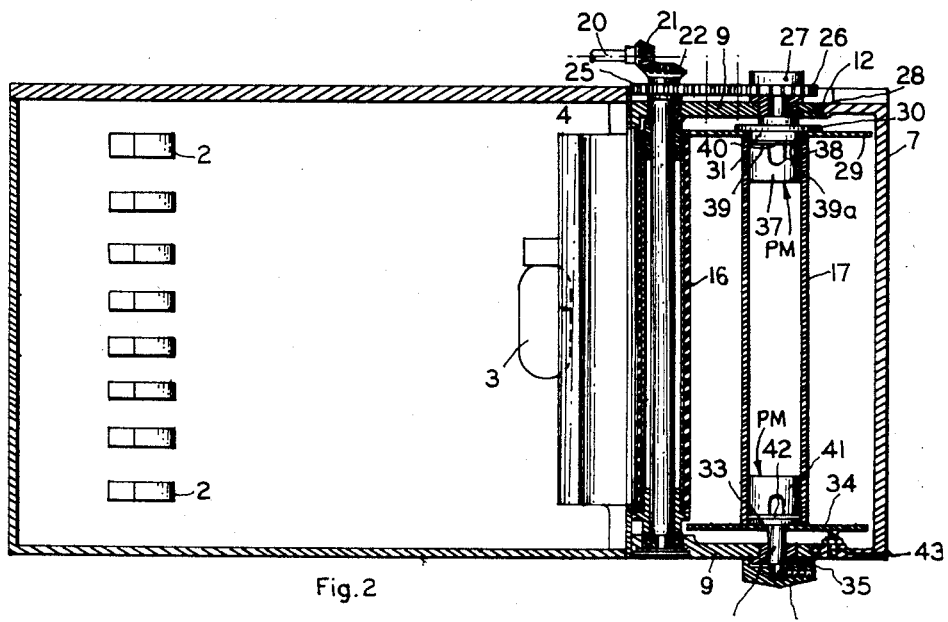
Figure 3:
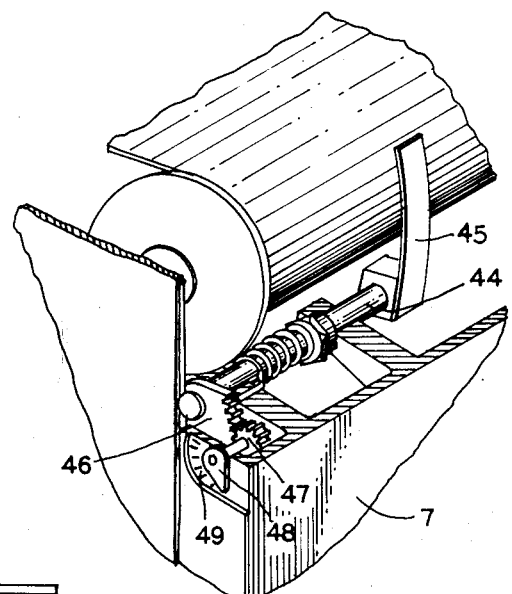
Figure 4:
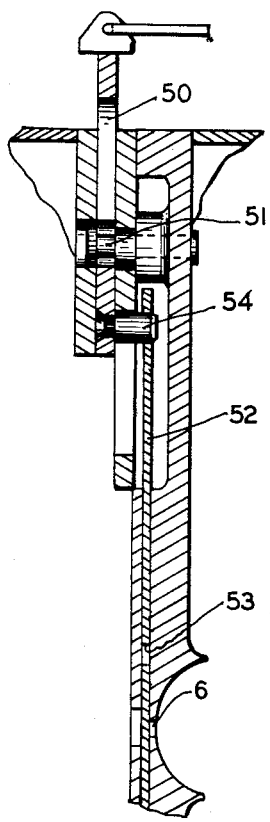
Figure 5:
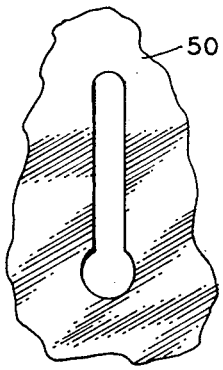

Referring to the drawings, Fig. 1 is an elevational view partly in cross section of an oscillograph embodying this invention; Fig. 2 is a plan view, also partly in cross section, of the oscillograph shown in Fig. 1; Fig. 3 is a perspective view of a portion of the film holder showing the supply spool and the film level indicator which continuously indicates the amount of film remaining on the supply spool; Fig. 4 is a fragmentary view in cross section showing the arrangement for attaching the film holder to the oscillograph casing and illustrating the interlocking arrangement for preventing light from entering the film holder casing when it is removed from the oscillograph; and Fig. 5 is a fragmentary front view of the arrangement shown in Fig. 4.

The oscillograph illustrated in Figs. 1 and 2, and embodying this invention, comprises a casing 1 which encloses the usual oscillograph elements such as a set of galvanometers 2, a light source 3, and suitable focusing lenses 4 and 5, for directing and focusing the light reflected from the galvanometer mirrors through an elongated slot 6 provided in the film holder casing.

The film holder assembly is enclosed by a cover 7, an end plate 8 and a pair of side plates 9 which are integrally affixed to the end plate 8. The cover 7 is secured to the side plates 9 by means of a pair of removable bolts 10 which are threaded into a pair of lugs 11 affixed to the inner surfaces of the side plates 9. A suitable light seal such as a rubber gasket 12 extends along the juncture of the cover plate 7 and the side plate 9 and is compressed into sealing engagement upon tightening of the bolts 10. The entire film holder assembly is pivoted to the casing 1 on a series of hinges 13 which are affixed to the end plate 8 of the film holder assembly. The hinges 13 can be disengaged from the casing 1 by sliding the film holder a limited amount in the axial direction so that the entire film holder assembly can thus be removed as a separate unit from the oscillograph casing 1. A securing and interlocking arrangement 14 is provided at the top of the film holder so that when the film holder is pivoted up against the casing 1 it can be firmly secured and locked in place. This arrangement will be described in more detail in connection with Figs. 4 and 5.

Referring to Fig. 3, there is attached to the cover portion 7 of the film holder a film level indicator which comprises a spring loaded shaft 44 having attached thereto an arm 45 which bears against the surface of the roll of unexposed film. The position of the arm 45 is transmitted through gears 46 and 47 to a pointer 48 which indicates the amount of film remaining on the supply spool on a suitable scale 49.

The securing and interlocking arrangement shown generally as 14 in Fig. 1 is illustrated in more detail in Figs. 4 and 5. The film holder is secured in place by means of a slotted plate 50, the slot having a shape as illustrated in Fig. 5, which engages a pin 51 as shown. A shutter 52, having an elongated slot 53 adapted to be aligned with the slot 6 in the end plate 8, is connected to the plate 50 through the agency of a pin 54. Thus when the plate 50 is raised to allow removal of the film holder assembly, the shutter 52 is also raised at the same time, thereby automatically sealing off the slot 6 so that no light can enter the film holder to adversely affect the film.

Referring again to Figs. 1 and 2, there is provided within the film holder assembly a series of film spools including a rotatably mounted supply spool 15 for supporting the unexposed film, a main drive spool 16 which frictionally engages and drives the film, and a receiving spool 17 onto which the film is rolled after it has been exposed. The film, which is indicated on the drawing by the numeral 18, is exposed to the light reflected from the galvanometers 2 through the elongated slot 6 as it is passed over the main drive spool 16. The surface of the main drive spool is composed of a suitable and preferably resilient material, such as rubber, having the proper frictional characteristics for driving the film through frictional engagement therewith. The film is held into engagement with the surface of the main drive spool by means of a spring loaded roller 19 which, in the particular embodiment described, is composed of a metallic material such as aluminum. In addition to holding the film into engagement with the main drive spool, the spring loaded roller 19 also serves to maintain the proper film tension since it will yield and allow additional slack in the film if the tension should exceed the spring force.

The main drive spool is driven through the shaft 20 and the associated bevel gears 21 and 22 as shown in Fig. 2. The shaft 20 may be connected to any suitable drive means such as, for instance, an electric motor and whatever associated gearing may be required to obtain the desired speed. Connecting gears 23 and 24 are provided between a gear 25 on the main drive spool shaft and the receiving spool drive gear 26 in order to effect the drive of the receiving spool.

The receiving spool 17 is mounted at one end on a drive spindle 27 which is rotatably supported in the end plate 9 in a journal bearing 28 and to which the gear 26 is attached. A film guide flange 29 is attached to a flange portion 30 on the drive spindle. The drive spindle also includes a cylindrical portion 31 which extends into the end of the receiving spool as shown in Fig. 2 to support and radially position that end of the spool in the film holder assembly. The receiving spool is supported and radially positioned at its other end by means of an axially movable spindle 32 which is provided with a similar cylindrical portion 33 adapted to extend into the end of the receiving spool. The spindle 32 also includes a film guide flange 34 which cooperates with the guide flange 29 on the drive spindle to position and contain the film as it builds up on the spool. The spindle 32 is rotatably mounted in a journal bearing 35 and is provided with a knob 36 attached to the spindle by means of a set screw so that the spindle can be manually rotated from the exterior of the unit.

It will be apparent that as the film builds up on the receiving spool 17, the speed of the spool must be proportionately reduced with respect to the speed of the main drive spool in order to prevent breakage of the film. In the present invention, this is accomplished by means of a friction slip clutch connection between the receiving spool and the drive means, with the frictional torque transmitting surfaces being held into engagement by magnetic means thus avoiding any end loading on the spool from the slip clutch connection.

In the embodiment illustrated a permanent magnet 37, having a channel 38 defining a pair of poles 39 and 39A, is pressed ito the receiving spool 17 as illustrated in Fig. 2. A friction disc 40 is positioned between the magnet 37 and the cylindrical extension 31 of the drive spindle in order to provide the desired frictional drive characteristics between these two members. The torque at which the drive assembly will slip is determined by the frictional surface characteristics of the disc 40 and of the surfaces of the magnet 37 and cylindrical extension 31 engaging the disc. It will be apparent that depending upon the size of the unit and the acceleration rate required, an adequate torque transmitting capacity may in some cases be obtained by omitting the disc 40 entirely and allowing the magnet to directly engage the drive spindle. Or a slight space may be maintained between the magnet 37 and the drive spindle and some other form of frictional engagement between the spool 17 and the drive spindle may be utilized.

It will be apparent that as the drive slips relative to the receiving spool, there will be some hysteresis effect contributing to the transmission of torque, but in view of the relatively small difference in speed between the drive means and the driven spool, this effect will be quite small so that the major portion of the drive torque will always be transmitted through frictional engagement.

A permanent magnet 41, which for cost reasons is preferably identical to the magnet 37, is inserted in the other end of the receiving spool as shown in Fig. 2. These elements 37 and 41 are designated by the legend PM in Fig. 2 to indicate that they are permanent magnets. The principal function of this magnet is to hold the axially movable spindle 32 into engagement with the receiving spool in such a manner that the spindle may be easily pushed aside to allow removal of the receiving spool from the unit. A friction disc 42 may be provided in order to ensure that the spindle 32 rotates with the spool, but in general this is not necessary since the torque transmitted is very low and the frictional engagement between the spool 17 and the guide flange 34 can be relied upon in most configurations to transmit this torque without slipping. The receiving spool can be manually rotated from the exterior of the casing by means of the knob 36 to allow proper angular positioning of the receiving spool during the film loading operation.

A set screw 43 is provided in the cover 7 to restrain axial movement of the receiving spool in the event that it is subjected to unusual shock conditions during operation. It can be seen that the set screw does not interfere with the removal of the receiving spool since the set screw is removed with the film holder cover 7 in order to gain access to the interior of the unit.

The supply spool 15 is removably mounted in the film holder in the same manner as that just described in connection with the receiving spool 17 except, of course, that no driving power is applied to the supply spool and consequently the magnetic drive arrangement is not provided.

It will be apparent from the foregoing that this invention provides a simple and inexpensive slip drive coupling arrangement for the receiving spool of an oscillograph film holder, which arrangement not only avoids any axial loading on the spool bearings but also permits quick and easy removal and insertion of the receiving spool. Further this invention provides a simple and inexpensive arrangement for removably mounting a film spool in an oscillograph film holder which arrangement not only avoids any axial load being placed on the spool but also virtually eliminates the problem of end play in such a removable assembly.

It will be appreciated that various modifications and changes may be made in the type of magnets used, in the positioning and arrangement of the magnets and in the configuration employed. For instance, it may be preferable in some cases to mount the magnets in the spindles rather than in the spools. Or the magnetic means may be stationary with the field linking the receiving spool and the spindle to urge these elements into frictional engagement. And it will be realized that the magnetic drive coupling may be employed in combination with other than magnetic mounting means for removably mounting the receiving spool, and vice versa, although the combination shown is preferable in view of the advantages set forth above.

In view of the foregoing, it is apparent that there are various changes, modifications and combinations which may be employed in accordance with these teachings without departing from the spirit and scope of this invention in its broader aspects.

What we claim as new and desire to secure by Letters Patent of the United States is:

1. An oscillograph film holder comprising a supply spool adapted to hold a quantity of unexposed film, a receiving spool for receiving said film after it has been exposed, a rotatably mounted drive spindle for frictionally driving said receiving spool and supporting one end thereof, drive means connected to drive said drive spindle, magnetic means within said receiving spool for urging said drive spindle and said receiving spool into frictional drive relationship with each other, a rotatably mounted spindle positioned adjacent the opposite end of said receiving spool and having a portion thereon adapted to engage and support said opposite end, said portion being axially movable into and out of engagement with said opposite end of said receiving spool to allow removal of said receiving spool from said film holder, and magnetic means associated with said opposite end of said receiving spool for exerting an axial force urging said movable portion of said last-mentioned spindles into supporting engagement with said opposite end of said receiving spool and automatically positioning the receiving spool between said spindles.

2. An oscillograph film holder comprising a supply spool adapted to hold a quantity of unexposed film, a receiving spool for receiving said film after it has been exposed, a main drive spool positioned to engage said film intermediate said supply spool and said receiving spool to drive said film through said film holder, rotatably mounted drive spindle for frictionally driving said receiving spool and supporting one end thereof, means interconnecting said drive spool and said drive spindle, drive means connected to drive said interconnected drive spool and drive spindle, a permanent magnet mounted within said receiving spool to rotate therewith and positioned adjacent a portion of said drive spindle with the field produced by said magnet passing through at least a portion of said drive spindle to urge said receiving spool into frictionally driven relationship with said drive spindle, a rotatably mounted spindle positioned adjacent the opposite end of said receiving spool and having a portion thereon adapted to engage and support said opposite end, said spindle being axially movable into and out of engagement with said receiving spool to permit removal of said receiving spool from said film holder, and a second permanent magnet mounted to rotate with said receiving spool and positioned adjacent said movable spindle to exert an axial magnetic force on said movable spindle urging said spindle into supporting engagement with said receiving spool.

3. An oscillograph film holder comprising a supply spool adapted to hold a quantity of unexposed film, a receiving spool for receiving said film after it has been exposed, a main drive spool positioned to engage said film intermediate said supply spool and said receiving spool to drive said film through said film holder, a drive spindle rotatably mounted for frictionally driving said receiving spool and supporting one end thereof, means interconnecting said drive spool and said drive spindle, drive means connected to drive said interconnected drive spool and said drive spindle, a frictional disc closing at least a portion of the end of said receiving spool adjacent to and in frictional contact with said drive spindle, a permanent magnet mounted within said receiving spool adjacent said frictional disc, the magnetic field produced by said magnet passing through said frictional disc and at least a portion of said drive spindle so as to urge said receiving spool into frictionally driven relationship with said drive spindle and enable said receiving spool to slip relative to said drive spindle at a predetermined drive torque level, and a rotatably mounted spindle positioned adjacent the opposite end of said receiving spool remote from said drive spindle and having a portion thereon adapted to engage and support said opposite end.

4. An oscillograph film holder comprising a supply spool adapted to hold a quantity of unexposed film, a receiving spool for receiving said film after it has been exposed, a main drive spool positioned to engage said film intermediate said supply spool and said receiving spool to drive said film through said film holder, a rotatably mounted drive spindle for frictionally driving said receiving spool and supporting one end thereof, drive means interconnecting said drive spool and said drive spindle, a frictional disc associated with the end of said receiving spool adjacent a portion of said drive spindle, a permanent magnet mounted within said receiving spool and adjacent to said frictional disc with the field produced by said magnet passing through at least a portion of said drive spindle to urge said receiving spool into frictionally driven relationship with said drive spindle, a second rotatably mounted spindle positioned adjacent the opposite end of said receiving spool and having a portion thereon adapted to engage and support said opposite end, said second spindle being axially movable into and out of engagement with said receiving spool to permit removal of said receiving spool from said film holder, and a second permanent magnet mounted within said receiving spool and positioned adjacent said movable spindle to exert an axial magnetic force on said movable spindle, urging said movable spindle into supporting engagement with said receiving spool.

5. An oscillograph film holder comprising a supply spool adapted to hold a quantity of unexposed film, a receiving spool for receiving said film after it has been exposed, a rotatably mounted drive spindle for driving said receiving spool and supporting one end thereof, drive means connected to drive said drive spindle, magnetic means within said receiving spool for urging said drive spindle and said receiving spool toward each other, a movable spindle positioned adjacent the opposite end of said receiving spool and having a portion thereon adapted to engage and support for rotation said opposite end, said portion being axially movable into and out of engagement with said opposite end of said receiving spool to allow removal of said receiving spool from said film holder, and magnetic means associated with said opposite end of said receiving spool for exerting an axial force to urge said movable portion of said last mentioned spindle into supporting engagement with said opposite end of said receiving spool whereby said movable spindle may move axially to automatically position and support said receiving spool.

6. An oscillograph film holder comprising a supply spool adapted to hold a quantity of unexposed film, a receiving spool for receiving said film after it has been exposed, a rotatably mounted drive spindle for driving said receiving spool and supporting one end thereof, said drive spindle including a flange to guide said film, drive means connected to drive said drive spindle, magnetic means directly associated with said receiving spool for urging said drive spindle and said receiving spool toward each other, a movable spindle positioned adjacent the opposite end of said receiving spool and having a portion thereon adapted to engage and support said opposite end and a flanged portion to guide said film, said portion being axially movable into and out of engagement with said opposite end of said receiving spool to allow removal of said receiving spool from said film holder, and magnetic means associated with said opposite end of said receiving spool for exerting an axial force to urge said movable portion of said last mentioned spindle into supporting engagement with said opposite end of said receiving spool whereby said movable spindle may move axially to automatically position the said flanges about said film and support said receiving spool.

References Cited in the file of this patent

UNITED STATES PATENTS

| | | |
|---|---|---|
| 2,039,697 | Wittel | May 5, 1936 |
| 2,043,914 | Wittel | June 9, 1936 |
| 2,179,334 | Keyes | Nov. 7, 1939 |
| 2,184,744 | Jonassen | Dec. 26, 1939 |
| 2,231,279 | Miron | Feb. 11, 1941 |
| 2,394,369 | Colegrove | Feb. 5, 1946 |
| 2,409,597 | Sonne et al. | Oct. 15, 1946 |
| 2,482,428 | Miller | Sept. 20, 1949 |
| 2,601,961 | Stephenson | July 1, 1952 |
| 2,610,806 | Lathrop | Sept. 16, 1952 |
| 2,656,127 | Bunch | Oct. 20, 1953 |
| 2,671,710 | Bowditch | Mar. 9, 1954 |
| 2,746,691 | Hoad | May 22, 1956 |